US006330455B1

(12) United States Patent
Ichihara (10) Patent No.: US 6,330,455 B1
(45) Date of Patent: Dec. 11, 2001

(54) TRANSMISSION POWER CONTROLLER FOR USE IN MOBILE COMMUNICATION TERMINAL EQUIPMENT (75) Inventor: Masaki Ichihara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/360,610

(22) Filed: Jul. 26, 1999

(30) Foreign Application Priority Data

Jul. 27, 1998 (JP) .................................................. 10-210856

(51) Int. Cl.$^7$ ................................. H04B 7/00; H04Q 7/20
(52) U.S. Cl. ............................. 455/522; 455/69; 455/70; 455/126
(58) Field of Search ..................... 455/522, 126, 455/127, 69, 70

(56) References Cited

U.S. PATENT DOCUMENTS

| 5,129,098 | * | 7/1992 | McGirr et al. ................... 455/69 |
| 5,287,555 | * | 2/1994 | Wilson et al. ................... 455/115 |
| 5,303,268 | * | 4/1994 | Tsutsumi et al. ................. 375/60 |
| 5,548,616 | * | 8/1996 | Muckes et al. ................... 375/295 |
| 5,590,409 | * | 12/1996 | Sawahashi et al. ................ 455/69 |
| 5,732,334 | * | 3/1998 | Miyake ........................... 455/126 |

FOREIGN PATENT DOCUMENTS

| 0610030 | 8/1994 | (EP) . |
| 0682417 | 11/1995 | (EP) . |
| 56-106431 | 8/1981 | (JP) . |
| 5-7178 | 1/1993 | (JP) . |
| 8-32514 | 2/1996 | (JP) . |
| 8-32515 | 2/1996 | (JP) . |
| 8-325515 | 2/1996 | (JP) . |
| 8-510614 | 11/1996 | (JP) . |
| 10-22756 | 1/1998 | (JP) . |
| 9221196 | 11/1992 | (WO) . |

OTHER PUBLICATIONS

Japanese Office Action issued Jan. 23, 2001 in a related application with English translation of the relevant portions.
European Search Report (in English) issued Feb. 25, 2000 in a related application.
Patent Abstracts of Japan, vol. 14, No. 518 (E1001), Nov. 14, 1990; & JP 02 217011 a (NEC Corporation) Aug. 29, 1990, abstract.

* cited by examiner

Primary Examiner—William Trost
Assistant Examiner—Marceau Milord

(57) ABSTRACT

Disclosed is a transmission power controller to prevent a transmission power from being excessive in mobile communication terminal equipment that requires a precise transmission power control. Branching filter 11, detector 12 and smoothing circuit 13 in combination generate a detected voltage corresponding to an average transmission power from the mobile communication terminal equipment. Threshold setting circuit 14 generates a threshold voltage corresponding to an allowable maximum average transmission power. Voltage comparator 15 decides if the average transmission power from the mobile communication terminal equipment is higher or lower than the allowable maximum average transmission power by comparing the detected voltage with the threshold voltage. Controller 16 varies a control voltage so as to lower a gain of a variable gain amplifier 4 if the average transmission power is decided to be higher than the allowable maximum average transmission power.

13 Claims, 6 Drawing Sheets

TRANSMISSION POWER CONTROLLER FOR USE IN MOBILE COMMUNICATION TERMINAL EQUIPMENT

BACKGROUND OF THE INVENTION

1. Field of the Invention

The present invention relates to a transmission power controller for use in a mobile communication terminal equipment.

2. Description of the Prior Art

Control circuits for controlling the maximum average transmission power to be below a certain value that is stipulated under the Radio Related Law generally include the so-called ALC (Automatic Level Control) circuit in conventional mobile communication terminal equipment of an analog FM (Frequency Modulation) system.

Figure 4:
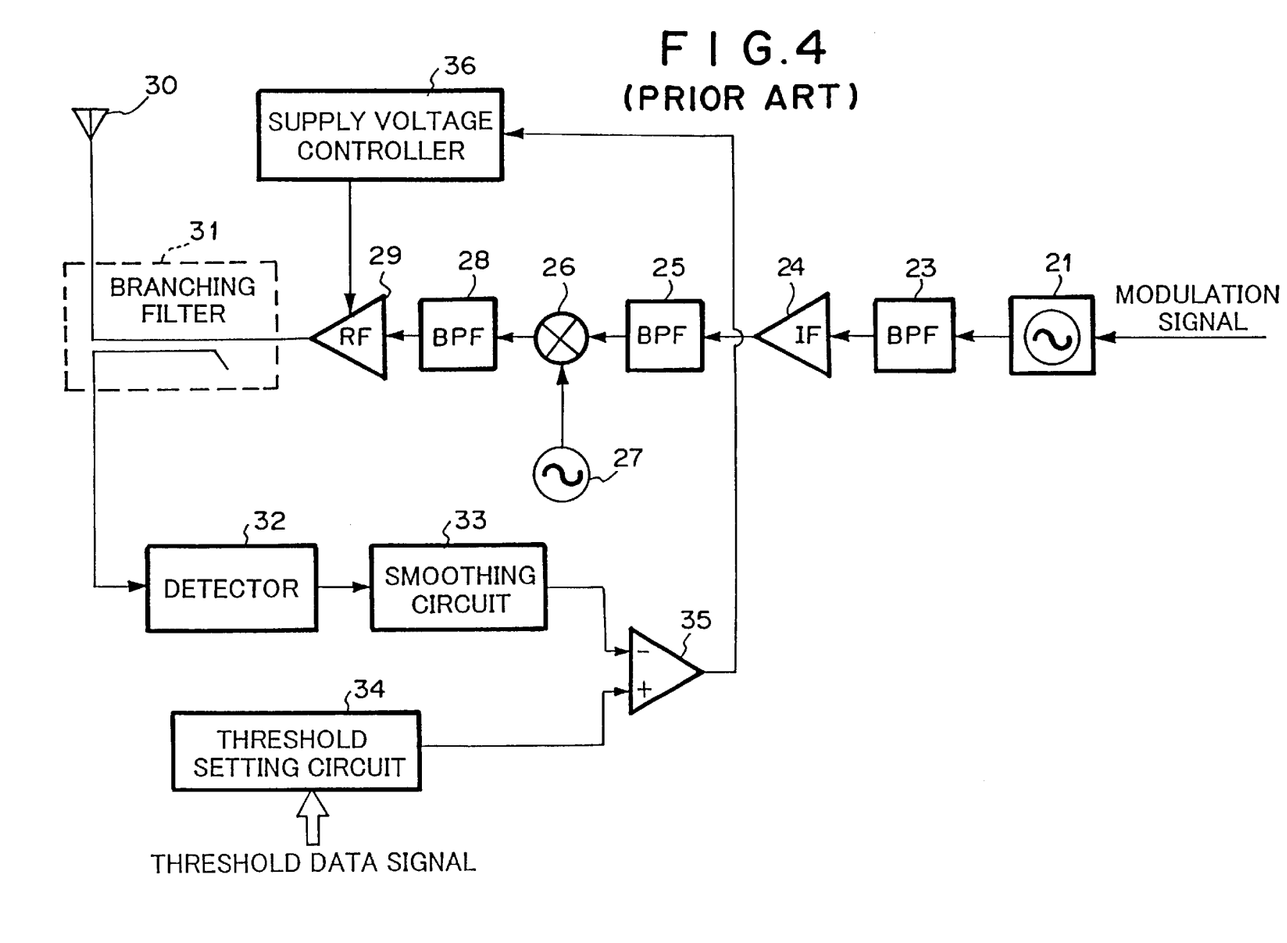
FIG. 4 is a block diagram of a conventional transmission power controller.

FIG. 4 exemplifies an arrangement of this circuit.

VCXO (Voltage Controlled Crystal Oscillator) 21 generates an IF (Intermediate Frequency) signal that is frequency modulated with a modulation signal.

Band pass filter 23 restrains a bandwidth for the output signals from VCXO 21 to eliminate undesired waves and allows the IF signal with a desired frequency to pass through.

IF amplifier 24 amplifies the IF signal output from band pass filter 23. Band pass filter 25 restrains a bandwidth for the output signals from IF amplifier 24 to eliminate undesired waves and allows the IF signal with the desired frequency to pass through.

Mixer 26 mixes the IF signal output from band pass filter 25 with a local signal output from local oscillator 27 to convert the IF signal to a RF (Radio Frequency) signal.

Band pass filter 28 restrains a bandwidth for the output signals from mixer 26 to eliminate undesired waves and allow the RF signal with a desired frequency to pass through. The RF signal output from band pass filter 28 is power-amplified at transmission power amplifier 29 and then radiated from antenna 30 as a transmission radio wave.

Branching filter 31 partly separates the output signal from transmission power amplifier 29. Detector 32 detects the output signal from transmission power amplifier 29 separated by branching filter 31. Smoothing circuit 33 smoothes the output signal from detector 32. Thus obtained is a DC voltage (hereinafter referred to as a detected voltage) corresponding to an average transmission power from the mobile communication terminal equipment including the transmission power controller in FIG. 4.

Threshold setting circuit 34, on the other hand, outputs on the basis of a threshold data signal a threshold voltage corresponding to the maximum average transmission power stipulated under the Radio Related Law.

Voltage comparator 35 compares the detected voltage output from smoothing circuit 33 with the threshold voltage output from threshold setting circuit 34.

A negative feedback control is further performed so as to equalize the average transmission power from the mobile communication terminal equipment with an allowable maximum average transmission power by adjusting at supply voltage controller 36 a supply voltage, bias voltage and the like of transmission power amplifier 29.

The above is the operation of the transmission power controller (ALC circuit) in the mobile communication terminal equipment of the conventional analog FM system.

CDMA (Code Division Multiple Access) is recently proposed as a technology for mobile communication terminal equipment in the next generation.

In order to overcome the Near-Far Problem in the CDMA system, it is necessary to control the transmission power of the mobile communication terminal equipment precisely over a wide range so that radio waves transmitted from mobile communication terminal equipments belonging to the same cell can arrive at a base station with substantially identical signal levels. The range for the control is wider than 80 dB and the resolution for the control is 1 dB.

It is impossible, however, to realize such complicated transmission power control by the ALC circuit as shown in FIG. 4.

In order to overcome this problem, a method of precisely adjusting a control voltage of a variable gain amplifier which operates at IF stage with a wide dynamic range is employed. "RF2609" available from RF Micro Device Inc. is well known as an example of such variable gain amplifier.

Figure 5:
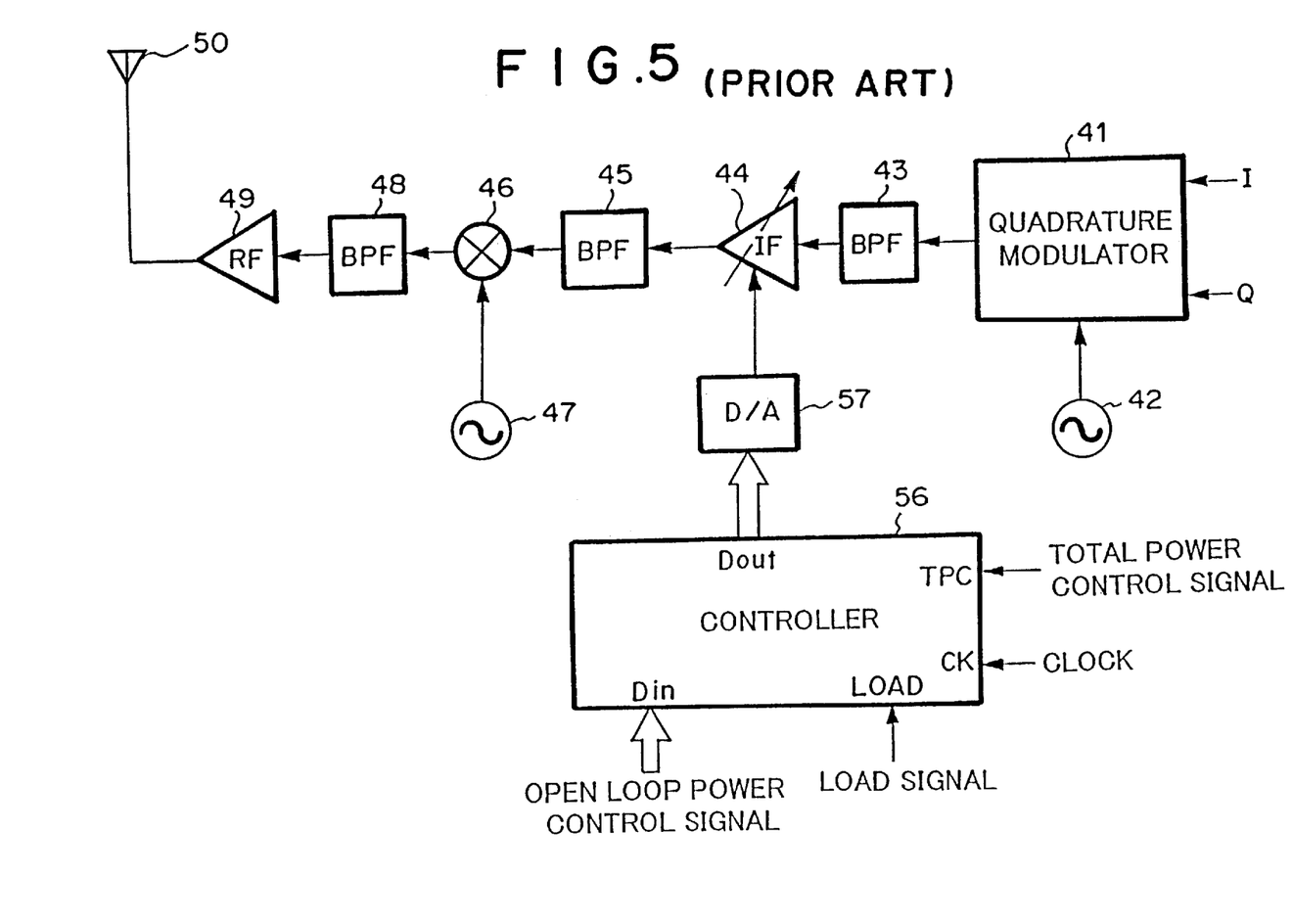
FIG. 5 is a block diagram of another conventional transmission power controller.

FIG. 5 shows an arrangement example of a transmission power controller with such variable gain amplifier. Quadrature modulator 41 is used in CDMA because modulation methods such as QPSK and offset QPSK are employed, instead of VCXO in the mobile communication terminal equipment of the analog FM system.

Quadrature modulator 41 has two base-band inputs: an in-phase component (I-signal); and a quadrature component (Q-signal). Quadrature modulator 41 modulates a local signal output from local oscillator 42 with the I-signal and Q-signal to generate an IF signal.

Band pass filter 43 restrains a bandwidth of the output signal of quadrature modulator 41 so as to eliminate undesired waves and obtain an IF signal with a desired frequency.

Variable gain amplifier 44 amplifies the IF signal output from band pass filter 43. Band pass filter 45 restrains a bandwidth of the output signals from variable gain amplifier 44 to eliminate undesired waves and allows the IF signal with the desired frequency to pass through.

Mixer 46 mixes the IF signal output from band pass filter 45 with a local signal output from local oscillator 47 to convert the IF signal into an RF signal.

Band pass filter 48 restrains a bandwidth of the output signals from mixer 46 to eliminate undesired waves and allow an RF signal with a desired frequency to pass through. The RF signal output from band pass filter 48 is power-amplified at transmission power amplifier 49 and then radiated from antenna 50 as a transmission radio wave.

The circuit of FIG. 5 does not use ALC circuit as shown in FIG. 4. Instead, the circuit of FIG. 5 includes D/A converter 57 to generate a control voltage for variable gain amplifier 44 and controller 56 to set data for D/A converter 57.

Two types of transmission power control, which are an open loop power control and a closed loop power control, are performed in CDMA systems. In the open loop power control, a mobile communication terminal equipment monitors the transmission power from a base station. If the transmission power is relatively higher, the mobile communication terminal equipment decides that the terminal located near to the base station and lowers its own transmission power. If the transmission power from the base station is relatively lower, the mobile communication terminal equipment decides that the terminal located far from the base station and elevates its own transmission power. The open loop power control signal is improved to controller 56 by the CPU of the mobile communication terminal equipment.

In the closed loop power control, the base station monitors the transmission power from the mobile communication terminal equipment. The base station transmits to the mobile communication terminal equipment a control signal for lowering the power if the transmission power is relatively higher and for elevating the power if the transmission power is relatively lower. The mobile communication terminal equipment periodically varies a control value of the transmission power by a certain variable amount such as 1 dB step in accordance with the total power control signal.

Figure 6:
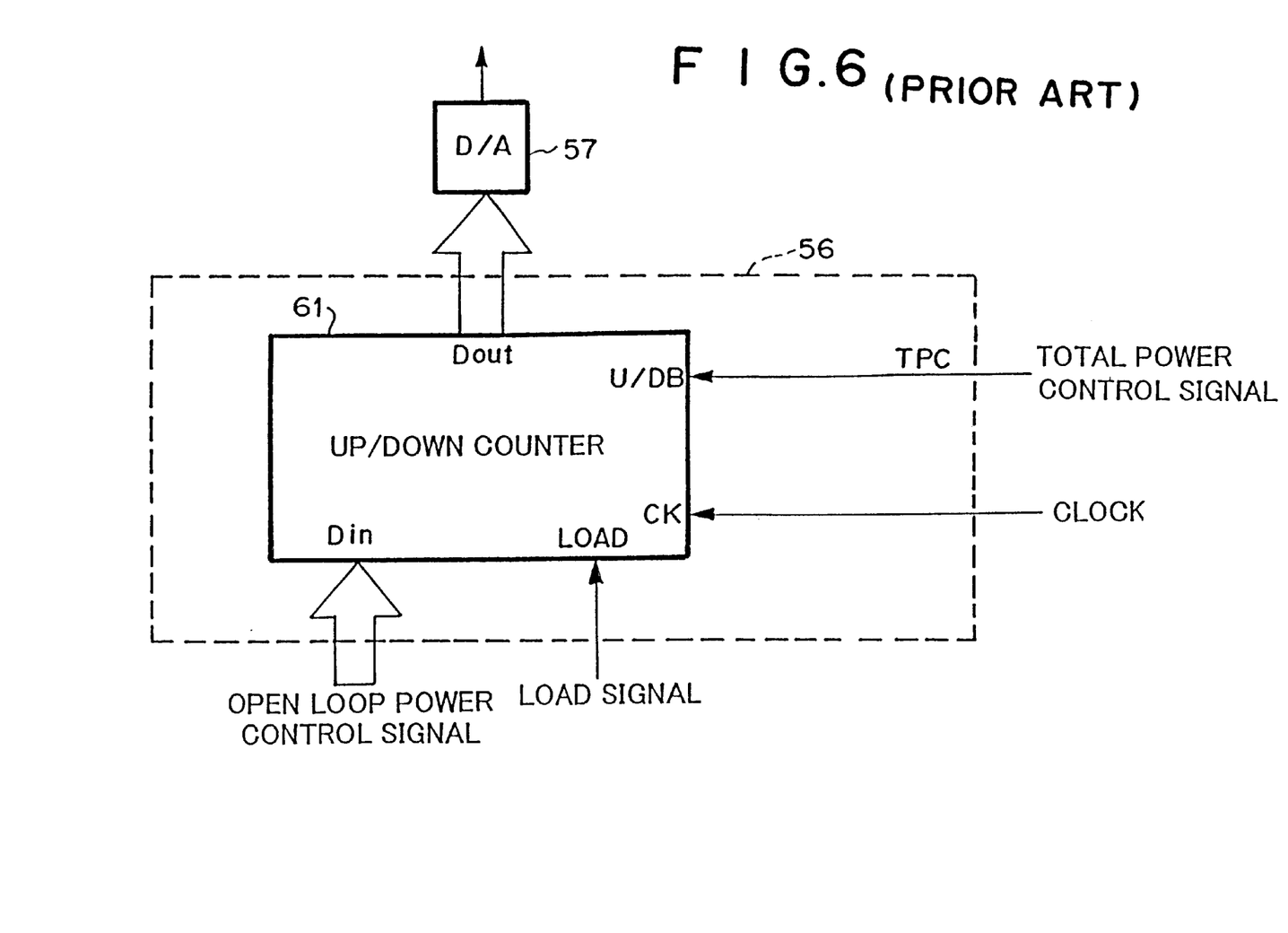
FIG. 6 is a block diagram of a controller in FIG. 5.

Controller 56 comprises an up/down counter 61 as shown in FIG. 6. The aforementioned total power control signal is a signal of 1 bit. When the signal has a value of "1", the signal instructs to elevate the transmission power. When the signal has a value of "0", the signal instructs to lower the transmission power. The total power control signal is fed to U/DB terminal of up/down counter 61 through TPC (Total Power Control) terminal of controller 56.

Up/down counter 61 counts periodically in synchronism with a clock signal fed to the CK terminal and counts up or down when an input to U/DB terminal is "1" or "0". Up/down counter 61 outputs its count value as digital data from the Dout terminal. D/A converter 57 converts the output data to an analog signal and outputs the analog signal as a control signal for variable gain amplifier 44.

The control voltage output from D/A converter 57 controls the gain of variable gain amplifier 44, which in turn controls the transmission power of the mobile communication terminal equipment.

Up/down counter 61 loads the open loop power control signal fed to Din terminal when a load signal is given to LOAD terminal and outputs as digital data from Dout terminal a count value corresponding to the control value of the power that is indicated with the control signal. D/A converter 57 converts the output data of controller 56 to an analog signal and outputs the analog signal as a control signal for variable gain amplifier 44 similarly to the above.

The above-mentioned are the operations of a conventional transmission power controller in a mobile communication terminal equipment of the CDMA system.

The transmission power controller of FIG. 5 causes the following disadvantages.

(1) When a mobile communication terminal equipment is far from a base station, the transmission power of the mobile communication terminal equipment which is monitored at the base station becomes low. Then, the base station transmits a total power control signal instructing to increase the transmission power. Therefore, if the mobile communication terminal equipment is extremely far from the base station, the closed loop power control for increasing the transmission power may be performed excessively. As a result, a transmission power which exceeds the allowable maximum average transmission power may be output sometimes from the mobile communication terminal equipment. In such case, the mobile communication terminal equipment violates the stipulations of the Radio Related Law although it satisfies the requirement from the base station. Operation in such case may also possibly interfere neighboring base stations.

(2) When a mobile communication terminal equipment is far from a base station, the transmission power of the base station which is monitored at the mobile communication terminal equipment becomes low. Then, the CPU of the mobile communication terminal equipment outputs a open loop power control signal instructing to increase the transmission power. Therefore, if the mobile communication terminal equipment is extremely far from the base station, the open loop power control for increasing the transmission power may be performed excessively. As a result, the same disadvantage as that in case of the closed loop power control is caused.

(3) The gain of the variable gain amplifier varies, depending on ambient temperatures. A desired transmission power can not be attained accordingly even if the total power control signal or open loop power control signal is appropriate. As a result, the same disadvantage as that in case of the closed loop power control is caused.

SUMMARY OF THE INVENTION

In order to overcome the aforementioned disadvantages, the present invention has been made, and accordingly, has an object to provide a transmission power controller capable of maintaining average transmission power below the maximum average transmission power stipulated under the Radio Related Law. The transmission power controller is adapted to a mobile communication terminal equipment which is required to control its transmission power with a relative precision (by 1 dB step and linear for dB) in a wide range (about 80 dB) to cope with to the Near-Far Problem in CDMA system, for example.

According to a first aspect of the present invention, there is provided a transmission power controller for use in mobile communication terminal equipment, comprising: a variable gain means arranged in a transmitter, for amplifying a transmission signal; a decision means for deciding whether an average transmission power from the mobile communication terminal equipment is higher or lower than an allowable maximum average transmission power; and a control means for controlling a gain of the variable gain means so as to lower a transmission power if the average transmission power is higher than the allowable maximum average transmission power.

In the transmission power controller, the variable gain means may amplify an intermediate frequency signal, wherein the intermediate frequency signal is the transmission signal.

In the transmission power controller, the decision means may have an input-output characteristic with a hysteresis.

The transmission power controller may further comprise: a means for transmitting a decided result of the decision means to a base station.

According to a second aspect of the present invention, there is provided a transmission power controller for use in a mobile communication terminal equipment, comprising: a variable gain means arranged in a transmitter, for amplifying a transmission signal; a detected voltage generating means for generating a detected voltage corresponding to an average transmission power from the mobile communication terminal equipment by detecting and smoothing a branched part of the output from a transmission power amplifier for amplifying a radio frequency signal; a threshold voltage generating means for generating a threshold voltage corresponding to an allowable maximum average transmission power; a decision means for deciding whether the average transmission power from the mobile communication terminal equipment is higher or lower than the allowable maximum average transmission power by comparing the detected voltage with the threshold voltage; and a control means for generating a control voltage to control a gain of the variable gain means, wherein the control means controls the control voltage so as to lower the gain of the variable gain means if the average transmission power is decided by the decision means to be higher than the allowable maximum average transmission power.

In the transmission power controller according to the first and second aspect, the variable gain means may amplify an intermediate frequency signal, wherein the intermediate frequency signal is the transmission signal.

In the transmission power controller according to the first and second aspect, the decision means may have an input-output characteristic with a hysteresis.

The transmission power controller according to the first and second aspect may further comprise: a means for transmitting a decided result of the decision means to a base station.

According to a third aspect of the present invention, there is provided a method for controlling a transmission power of a mobile communication terminal equipment, comprising steps of: deciding whether an average transmission power from the mobile communication terminal equipment is higher or lower than an allowable maximum average transmission power; and controlling a gain of a variable gain means so as to lower a transmission power if the average transmission power is higher than the allowable maximum average transmission power, the variable gain means being arranged in a transmitter in the mobile communication terminal equipment and used for amplifying a transmission signal.

Other features and advantages of the invention will be apparent from the following description of the preferred embodiments thereof.

BRIEF DESCRIPTION OF THE DRAWINGS

The present invention will be more fully understood from the following detailed explanation with reference to the accompanying drawings in which.

DETAILED DESCRIPTION OF THE PREFERRED EMBODIMENTS

[First Embodiment]

Figure 1:
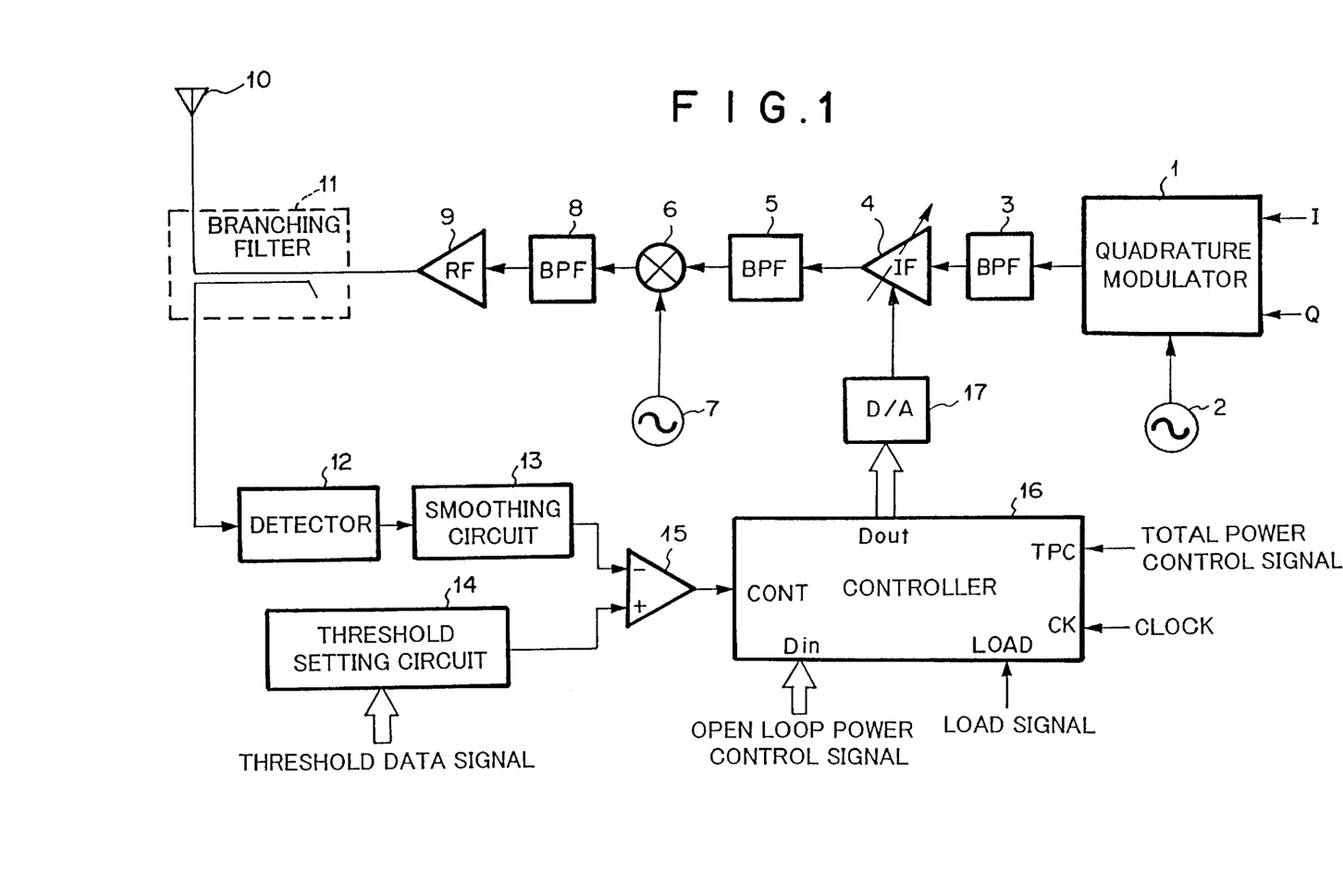
FIG. 1 is a block diagram showing a transmission power controller according to a first embodiment of the present invention.

Embodiments of the present invention will be explained in detail next with reference to the drawings. FIG. 1 is a block diagram of a transmission power controller showing a first embodiment of the present invention.

The transmission power controller of this embodiment is used for mobile communication terminal equipment in CDMA system. Quadrature modulator 1 is used in CDMA because modulation methods such as QPSK (Quadriphase Phase Shift Keying) and offset QPSK are employed, instead of VCXO in the mobile communication terminal equipment of the analog FM system.

Quadrature modulator 1 has two base-band inputs: an in-phase component (I-signal); and a quadrature component (Q-signal). Quadrature modulator 1 modulates a local signal output from local oscillator 2 with the I-signal and Q-signal to generate an IF signal.

Band pass filter 3 restrains a bandwidth of the output signal of quadrature modulator 1 which passes therethrough, so as to eliminate undesired waves thereof and obtain an IF signal with a desired frequency.

Variable gain amplifier 4 amplifies the IF signal output from band pass filter 3. Band pass filter 5 restrains a bandwidth of the output signal from variable gain amplifier 4 to eliminate undesired waves and allows an IF signal with a desired frequency to pass through. Gain control for variable gain amplifier 4 will be explained later.

Mixer 6 mixes the IF signal output from band pass filter 5 with a local signal output from local oscillator 7 to convert the IF signal to a RF signal.

Band pass filter 8 restrains a bandwidth of the output signals from mixer 6 to eliminate undesired waves and allow an RF signal with a desired frequency to pass through.

The RF signal output from band pass filter 8 is power-amplified at transmission power amplifier 9 and then radiated from antenna 10 as a transmission radio wave.

Branching filter 11 partly separates the output signal from transmission power amplifier 9. Detector 12 detects the output signal from transmission power amplifier 9 separated by branching filter 11. Smoothing circuit 13 smoothes the output signal from detector 12.

Thus obtained is a DC voltage (hereinafter referred to as a detected voltage) corresponding to an average transmission power from the mobile communication terminal equipment including the transmission power controller in FIG. 1.

Detector 12 comprises a Shottky barrier diode, for example. Smoothing circuit 13 comprises a low pass filter consisting of coils and capacitors.

Smoothing circuit 13 may also comprise an active low pass filter consisting of an operational amplifier and capacitors in order to obtain the detected voltage corresponding to a long-term average transmission power.

Threshold setting circuit 14, on the other hand, outputs on the basis of a threshold data signal a threshold voltage corresponding to the maximum average transmission power stipulated under the Radio Related Law. Threshold setting circuit 14 comprises a D/A converter, for example. Threshold setting circuit 14 receives the threshold data signal corresponding to the maximum average transmission power from the system CPU (not shown) and outputs a DC voltage obtained by converting the threshold data signal from digital to analog, which is the threshold voltage.

Threshold setting circuit 14 can also be realized by a simple arrangement that divides the supply voltage with a variable resistor or the like. The threshold data signal is not required in this case.

Voltage comparator 15 compares the detected voltage output from smoothing circuit 13 with the threshold voltage output from threshold setting circuit 14. The detected voltage is applied to the inverting input terminal of voltage comparator 15 and the threshold voltage is applied to the non-inverting input terminal thereof in this embodiment.

If the average transmission power of the mobile communication terminal equipment including the transmission power controller is higher than the allowable maximum average transmission power, the output signal of voltage comparator 15 becomes "L" level (="0") because the detected voltage becomes higher than the threshold voltage.

To the contrary, if the average transmission power is lower than the allowable maximum average transmission power, the output signal of voltage comparator 15 becomes "H" level (="1") because the detected voltage becomes lower than the threshold voltage.

Controller 16 and D/A converter 17 will be explained next. Two types of transmission power control, which are an open loop power control and a closed loop power control, are performed in CDMA system.

In the open loop power control, the mobile communication terminal equipment monitors the transmission power from the base station. If the transmission power is relatively higher, the mobile communication terminal equipment decides that the terminal is near to the base station and lowers its own transmission power. If the transmission power from the base station is relatively lower, the mobile communication terminal equipment decides that the terminal is far from the base station and elevates its own transmission power. The open loop control signal set is provided to controller 16 by the CPU of the mobile communication terminal equipment is (not shown).

In the closed loop power control, the base station monitors the transmission power from the mobile communication terminal equipment. The base station transmits to the mobile communication terminal equipment a total power control signal for lowering the transmission power if the transmission power is too high and a control signal for elevating the transmission power if the transmission power is too low. The mobile communication terminal equipment varies periodically a control value of the transmission power by a certain variable amount such as 1 dB step in accordance with the control signal.

Figure 2:
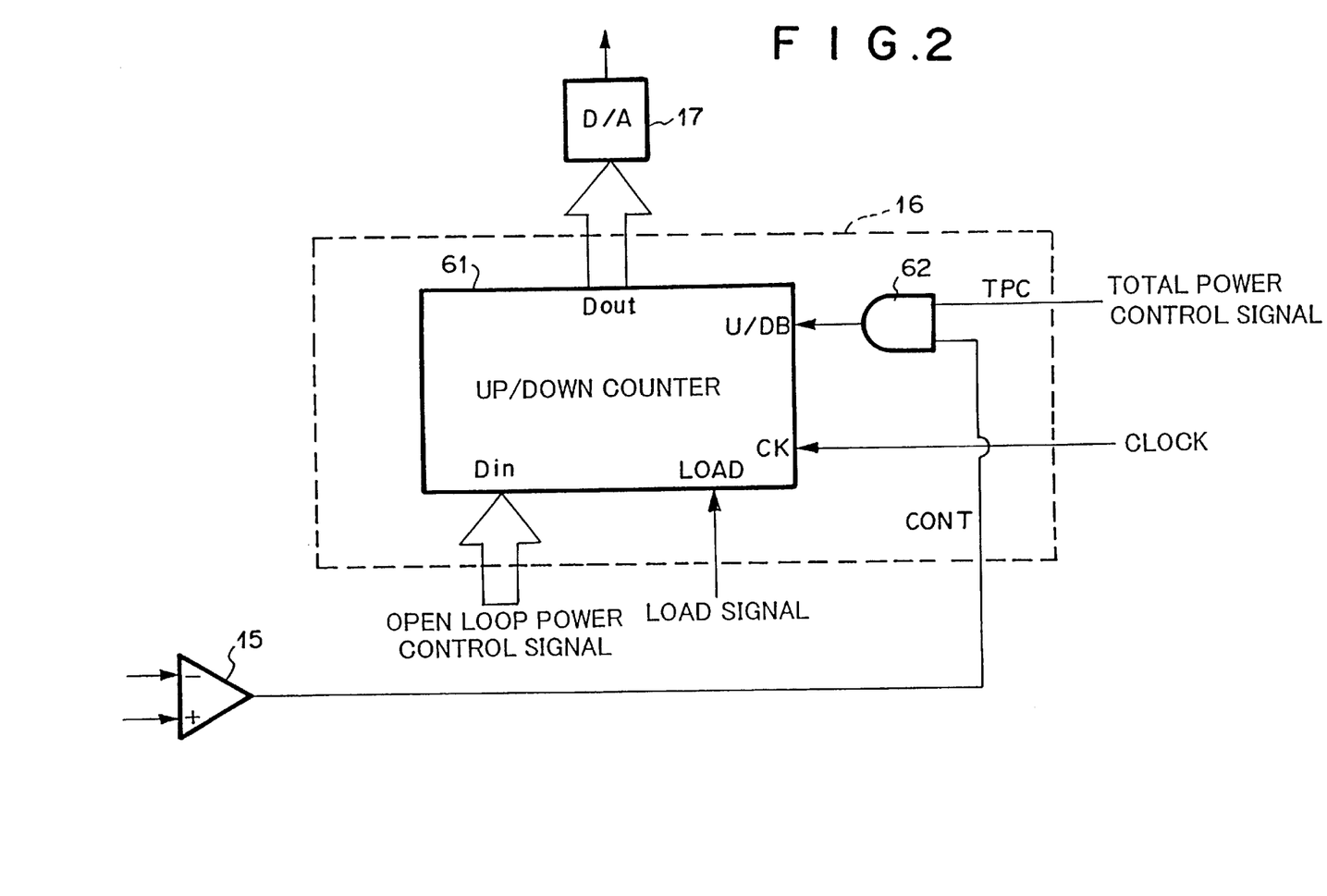
FIG. 2 is a block diagram of a controller in FIG. 1.

The open loop power control and the closed loop power control, and the transmission power control according to the present invention based on the result obtained by comparing the detected voltage with the threshold voltage are preformed in controller 16. The controller comprises up/down counter 61 and AND gate 62 as shown in FIG. 2.

The total power control signal is a signal consisting of 1 bit received from the base station at a receiving means (not depicted) in the mobile communication terminal equipment. When the signal has a value of "1", the signal instructs to elevate the transmission power. When the signal has a value of "0", the signal instructs to lower the transmission power. The total power control signal is fed to one input terminal of AND gate 62 through the TPC terminal of controller 16.

Up/down counter 61 counts periodically in synchronism with clocks fed to CK terminal and counts up or down when an input to U/DB terminal for alternating up-count and down-count is "1" or "0". A function for preventing overflow or underflow of counter 61 when counter 61 continuously count up or down is of course necessary, however, it is not related directly to the present invention and an explanation thereof is omitted.

Up/down counter 61 outputs its count value as digital data consisting of plural bits from Dout terminal. D/A converter 17 converts the output data of controller 16 (or up/down counter 61) from digital to analog and outputs the converted result as a control signal for variable gain amplifier 4.

The control voltage output from D/A converter 17 controls the gain of variable gain amplifier 4, which in turn controls the transmission power of the mobile communication terminal equipment.

Up/down counter 61 loads the open loop power control signal consisting of plural bits fed to Din terminal when a load signal is given to LOAD terminal, and outputs as digital data consisting of plural bits from Dout terminal a count value corresponding to the control value of the power indicated with the control signal. D/A converter 17 converts the output data of controller 16 from digital to analog and outputs the control signal for variable gain amplifier 4 similarly to the above.

The output signal from voltage comparator 15 is fed to the other input terminal of AND gate 62 through CONT terminal of controller 15 in this embodiment. AND gate 62 makes a logical product of the total power control signal and the output signal from voltage comparator 15. The output signal of AND gate 62 is supplied to U/DB terminal of up/down counter 61.

If the average transmission power of the mobile communication terminal equipment is higher than the allowable maximum average transmission power, the output signal of voltage comparator 15 becomes "0" as described above. To the contrary, if the average transmission power is lower than the allowable maximum average transmission power, the output signal of voltage comparator 15 becomes "1".

Therefore, when the average transmission power of the mobile communication terminal equipment is higher than the allowable maximum average transmission power, the output of AND gate 62 becomes "0" even if the total power control signal exhibits "1" which instructs to elevate the transmission power. Thus, up/down counter 61 counts down. As a result, the control voltage output from D/A converter 17 decreases and the transmission power becomes lower.

When the total power control signal exhibits "1" which instructs to elevate the transmission power and the average transmission power of the mobile communication terminal equipment is lower than the allowable maximum average transmission power, the output of AND gate 62 becomes "1". Thus, up/down counter 61 counts up. As a result, the control voltage output from D/A converter 17 increases and the transmission power becomes higher.

When the total power control signal exhibits "0" which instructs to lower the transmission power, the output of AND gate 62 becomes "0" and the transmission power becomes lower, needless to say.

Thus, the open loop power control based on the open loop power control signal and the closed loop power control based on the total power control signal, and the transmission power control according to the present invention based on the result obtained by comparing the detected voltage (the average transmission power) with the threshold voltage (the allowable maximum average transmission power) are compossible. It is possible to operate so as to compulsorily lower the transmission power, if the average transmission power of the mobile communication terminal equipment is higher than the allowable maximum average transmission power, while ignoring the open loop power control and the closed loop power control.

When the mobile communication terminal equipment locates far from the base station, both the transmission power of the mobile communication terminal equipment monitored at the base station and the transmission power of the base station monitored at the mobile communication terminal equipment become low. Then, the base station transmits the total power control signal instructing to increasing the transmission power and the mobile communication terminal equipment also generates from its CPU the open loop power control signal instructing to increasing the transmission power. Therefore, the closed loop power control and open loop power control both perform the transmission power control in the same direction in this case.

[Second Embodiment]

Figure 3:
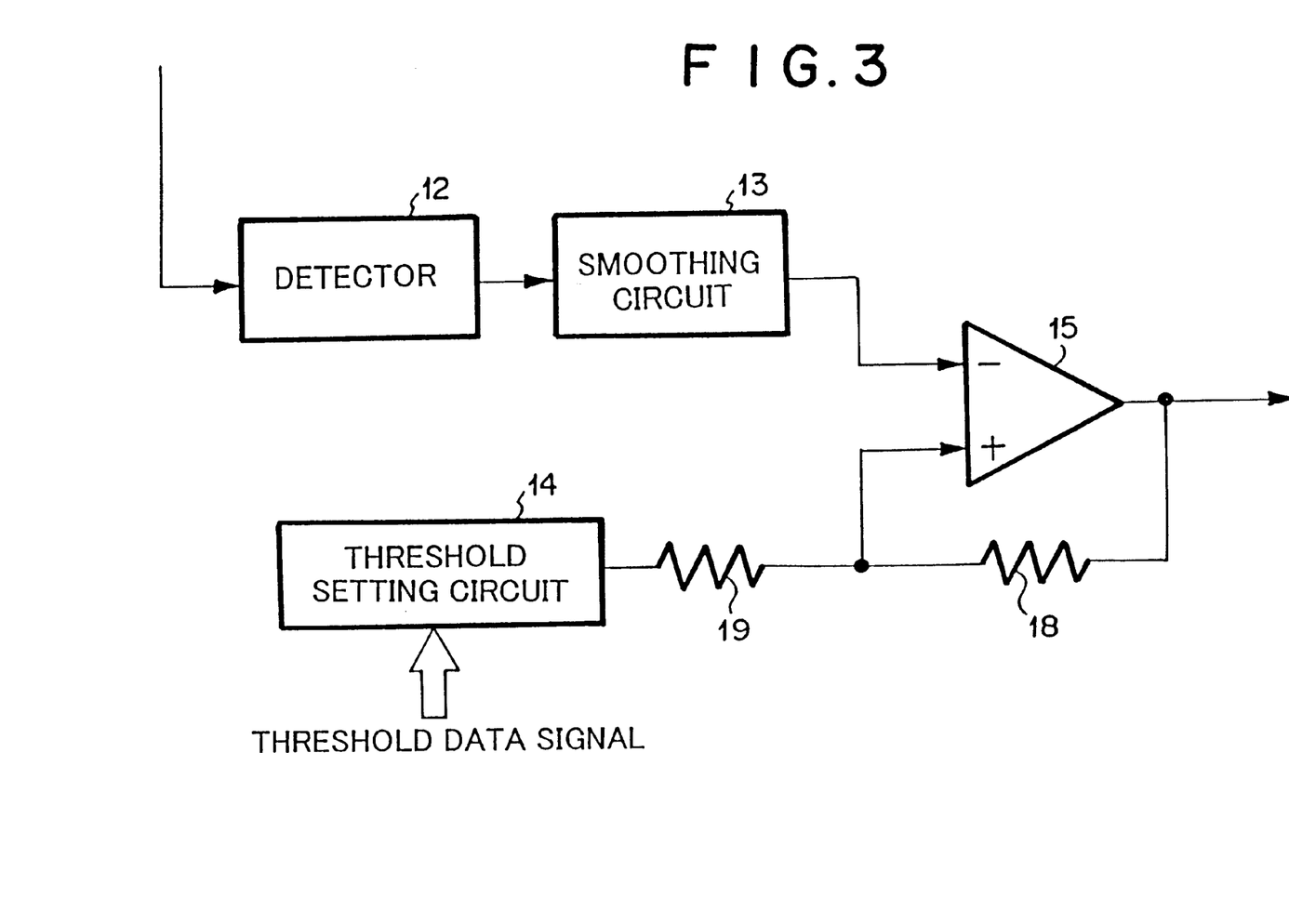
FIG. 3 is a block diagram showing a transmission power controller according to a second embodiment of the present invention.

FIG. 3 is a block diagram of a transmission power controller showing a second embodiment of the present invention, in which the same reference numerals are given to the same parts as those shown in FIG. 1. FIG. 3 only shows parts different from the transmission power controller shown in FIG. 1.

The transmission power controller of this embodiment has a arrangement fundamentally similar to that of the first embodiment. This embodiment gives a hysteresis to voltage comparator 15 in order to prevent the decided result from hunting. Resistors 18 and 19 for positively feeding the output of voltage comparator 15 back to the threshold voltage side are added to the circuit in FIG. 1 in order to give the hysteresis to voltage comparator 15.

[Third Embodiment]

The output signal of voltage comparator 15 (that is a result obtained by comparing the detected voltage with the threshold voltage) may be detected by a detecting means such as a CPU not depicted, and the detected result can be transmitted to the base station. In order to realize the transmission of the detected result, the detected result from the detecting means is converted into an I-signal and/or a Q-signal which are to be fed to quadrature modulator 1.

The base station can recognize whether or not the average transmission power of the mobile communication terminal equipment exceeds the maximum average transmission power accordingly.

When the average transmission power of the mobile communication terminal equipment exceeds the maximum average transmission power, it is also possible to control the mobile communication terminal equipment by instructing to reduce the transmission power with the total power control signal transmitted from the base station.

Variable gain amplifier 4 may be arranged at a location where the RF or base-band signal is amplified although it is arranged at the location where the IF signal is amplified in the above embodiments.

According to the present invention, the variable gain means is arranged in the transmitter and the decision means and control means are also employed. Thus, the transmission power is compulsorily lowered, if the average transmission power of the mobile communication terminal equipment is higher than the allowable maximum average transmission power, while ignoring the open loop power control and closed loop power control. Transmission power control with a wide dynamic range and relatively high precision in a CDMA system and the like become possible, while preventing the average power from exceeding the maximum average transmission power stipulated under the Radio Related Law. Thus, it is possible to prevent the transmission power of the mobile communication terminal equipment from being excessive, to prevent it from violating the stipulations of the Radio Related Law, and to prevent from interfering with neighboring cells. It is also possible to prevent the transmission power of the mobile communication terminal equipment from being excessive due to ambient temperatures.

Giving the input-output characteristic with the hysteresis to the decision means may prevent the decided result from hunting.

Providing the means for transmitting the decided result of the decision means to the base station may notify the base station whether or not the average transmission power of the mobile communication terminal equipment exceeds the maximum average transmission power. The base station can then control the transmission power of the mobile communication terminal equipment based on the notification.

Although the present invention has been shown and explained with respect to the preferred mode embodiments thereof, it should be understood by those skilled in the art that the forgoing and various other changes, omissions, and additions in the form and detail thereof may be made therein without departing from the spirit and scope of the present invention.

What is claimed is:

1. A transmission power controller for use in mobile communication terminal equipment, comprising:

a variable gain amplifier that amplifies a communication signal to be transmitted from the mobile communication terminal equipment to a base station;

a detector circuit responsive to the transmission power level;

a smoothing circuit connected to the output of the detector circuit;

a transmitted power reference circuit that generates a threshold signal representing a maximum allowable average transmission power, a decision circuit that determines whether average transmission power from the mobile communication terminal equipment is higher or lower than the allowable maximum average transmission power, the decision circuit being operative to compare the threshold signal and the output of the smoothing circuit and to generate a decision signal having a first value if the threshold signal exceeds the output of the smoothing circuit, and having a second value if the output of the smoothing circuit exceeds the threshold signal; and a control circuit responsive to an open loop control signal and a closed loop control signal transmitted from the base station to adjust the transmission power as a function of the distance between the mobile communication terminal equipment and the base station, and further responsive to an output signal from the decision circuit that controls the gain of the variable gain amplifier to limit the transmission power if the average transmission power is greater than the allowable maximum average transmission power, the control circuit being operative in response to the first value of the decision signal to enable the gain of the variable gain amplifier to be raised and responsive to the second value of the decision signal to lower the gain of the variable gain amplifier.

2. The transmission power controller according to claim 1, wherein the decision circuit has an input-output characteristic with a hysteresis.

3. The transmission power controller according to claim 1, wherein the variable gain amplifier amplifies an intermediate frequency signal, the intermediate frequency signal being the communication signal.

4. The transmission power controller according to claim 1, further comprising a transmission circuit that transmits a signal representing the output of the decision circuit to the base station.

5. The transmission power controller according to claim 1, wherein the variable gain amplifier amplifies an intermediate frequency signal, the intermediate frequency signal being the communication signal.

6. The transmission power controller according to claim 1, further comprising a transmission circuit that transmits a signal representing the decision signal to the base station.

7. The transmission power controller according to claim 1, wherein:

the control circuit is operative to set a control signal at a value representing the open loop control signal, responsive to a first value of the closed loop control signal to increase the value of the control signal if the decision signal has the first value, and responsive to the second value of the decision signal to decrease the value of the control signal irrespective of the value of the closed loop control signal, the gain of the variable gain amplifier being a function of the control signal.

8. The transmission power controller according to claim 1, wherein:

the control circuit is comprised of:
a counter;
a first input of the counter being connected to the open loop control signal;
a gate circuit having a first input connected to the closed loop control signal, a second input connected to the output of the decision circuit, and an output connected to a second input of the counter, the gate producing an output signal having a first value when the output of the decision circuit is at the first value and the closed loop control signal is at its first value, and a second value otherwise; and
a clock signal generator connected to a third input of the counter,
the counter being operative to load the value of the open loop control signal as a count value in response to a signal at a fourth input thereof,
responsive to the first value of the gate output signal and the clock signal to increase the count value, and
responsive to the second value of the gate output signal and the clock signal to decrease the count value; and further including
a conversion circuit responsive to the count value to generate a signal for controlling the gain of the variable gain amplifier.

9. The transmission power controller according to claim 1, wherein:
the control circuit is operative to set a control signal at a value representing the open loop control signal, responsive to a first value of the closed loop control signal to increase the value of the control signal if the decision signal has the first value, and responsive to a second value of the decision signal to decrease the value of the control signal irrespective of the value of the closed loop control signal,
the gain of the variable gain amplifier being a function of the control signal.

10. A transmission power controller for use in mobile communication terminal equipment, comprising:
a variable gain amplifier that amplifies a communication signal to be transmitted from the mobile communication terminal equipment to a base station;
a decision circuit that determines whether average transmission power from the mobile communication terminal equipment is higher or lower than an allowable maximum average transmission power; and
a control circuit responsive to an open loop control signal and a closed loop control signal transmitted from the base station to adjust the transmission power as a function of the distance between the mobile communication terminal equipment and the base station, and further responsive to an output signal from the decision circuit that controls the gain of the variable gain amplifier to limit the transmission power if the average transmission power is greater than the allowable maximum average transmission power, wherein the control circuit is comprised of:
a counter;
a first input of the counter being connected to the open loop control signal;
a gate circuit having a first input connected to the closed loop control signal, a second input connected to the output of the decision circuit, and an output connected to a second input of the counter, the gate producing an output signal having a first value when the output of the decision circuit is at the first value and the closed loop control signal is at its first value, and a second value otherwise; and
a clock signal generator connected to a third input of the counter,
the counter being operative to load the value of the open loop control signal as a count value in response to a signal at a fourth input thereof,
the control circuit being responsive to the first value of the gate output signal and the clock signal to increase the count value, and
the control circuit being responsive to the second value of the gate output signal and the clock signal to decrease the count value; and further including
a conversion circuit responsive to the count value to generate a signal for controlling the gain of the variable gain amplifier.

11. The transmission power controller according to claim 10, wherein the decision circuit has an input-output characteristic with a hysterestis.

12. A method for controlling transmission power of a mobile communication terminal, comprising the steps of:
detecting a transmission signal to be output to a base station;
smoothing the detected transmission signal to obtain an average transmission power;
determining whether average transmission power from the mobile communication terminal is higher or lower than an allowable maximum average transmission power at a given time to produce a decision signal having a first value if the average transmission power is lower than the allowable maximum average transmission power and having a second value if the average transmission power is higher than the allowable maximum average transmission power;
inputting an open loop control signal, a closed loop control signal transmitted from the base station, and the decision signal to a control circuit;
generating, by the control circuit, a control signal to adjust the transmission power of the mobile communication terminal in response to the open loop control signal and the closed loop control signal if the decision signal has the first value, and responsive to lower the transmission power if the decision signal has the second value.

13. A method according according to claim 12, wherein the step of generating the control signal comprises the steps of:
setting the control signal at a value representative of the open loop control singal;
increasing the value of the control signal in response to a first value of the closed loop control signal and a first value of the decision signal; and
reduction the value of the control signal in response to a second value of the decision signal, irrespective of the value of the closed loop control signal.

* * * * *